United States Patent
Jahnke et al.

(10) Patent No.: US 10,109,874 B2
(45) Date of Patent: Oct. 23, 2018

(54) SHIFT REACTOR FOR DIRECT FUEL CELL HYDROGEN SYSTEM

(71) Applicant: FuelCell Energy, Inc., Danbury, CT (US)

(72) Inventors: Fred C. Jahnke, Rye, NY (US); Matthew Lambrech, Sherman, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 18 days.

(21) Appl. No.: 15/344,107

(22) Filed: Nov. 4, 2016

(65) Prior Publication Data
US 2018/0131023 A1     May 10, 2018

(51) Int. Cl.
*C01B 3/16*     (2006.01)
*B01J 8/04*     (2006.01)
(Continued)

(52) U.S. Cl.
CPC ............. *H01M 8/0618* (2013.01); *B01J 7/02* (2013.01); *B01J 8/0465* (2013.01); *C01B 3/16* (2013.01);
(Continued)

(58) Field of Classification Search
CPC .............. Y02P 20/52; Y02P 20/128; C01B 2203/0233; C01B 2203/1017; C01B 2203/107; C01B 2203/1058; C01B 3/48; C01B 2203/1064; C01B 2203/0244; C01B 2203/1052; C01B 2203/0288; C01B 3/384; C01B 3/16; C01B 2203/066; C01B 2203/0827; C01B 2203/0822; C01B 2203/0877; C01B 2203/0495;
(Continued)

(56) References Cited

U.S. PATENT DOCUMENTS 3,541,729 A   11/1970   Dantowitz
4,861,348 A   8/1989    Koyama et al.
(Continued)

FOREIGN PATENT DOCUMENTS

DE   10041712 A1   3/2002
EP   0 600 621 A1   6/1994
(Continued)

OTHER PUBLICATIONS

International Search Report and Written Opinion in PCT/US2017/049881 dated Nov. 22, 2017 (16 pages).

*Primary Examiner* — Amber R Orlando
*Assistant Examiner* — Syed T Iqbal
(74) *Attorney, Agent, or Firm* — Foley & Lardner LLP

(57) ABSTRACT

A multi-stage shift reactor includes a vessel having an inner chamber configured to contain a first shift catalyst, the first shift catalyst configured to receive anode exhaust gas form a fuel cell and to output a first shifted gas, and an outer chamber annularly disposed about the inner chamber and configured to contain a second shift catalyst, the second shift catalyst configured to receive the first shifted gas and output a second shifted gas. The shift reactor further includes a water injection port downstream from the inner chamber and packing between the water injection port and the outer chamber, the packing configured to prevent liquid water from passing therethrough.

20 Claims, 2 Drawing Sheets

(51) Int. Cl.
*H01M 8/0668* (2016.01)
*H01M 8/0612* (2016.01)
*B01J 7/02* (2006.01)
*H01M 8/04119* (2016.01)
*H01M 8/0662* (2016.01)
*B01J 19/30* (2006.01)

(52) U.S. Cl.
CPC ..... *H01M 8/04156* (2013.01); *H01M 8/0662* (2013.01); *H01M 8/0668* (2013.01); *B01J 19/30* (2013.01); *B01J 2208/00106* (2013.01); *B01J 2208/00884* (2013.01); *B01J 2208/025* (2013.01); *C01B 2203/0288* (2013.01); *C01B 2203/0495* (2013.01); *C01B 2203/066* (2013.01); *C01B 2203/0877* (2013.01); *C01B 2203/1205* (2013.01)

(58) Field of Classification Search
CPC ... C01B 2203/1205; B01J 23/78; B01J 23/80; B01J 23/862; B01J 7/02; B01J 8/0465; H01M 8/04156; H01M 8/0618; H01M 8/0662; H01M 8/0668
See application file for complete search history.

(56) References Cited

U.S. PATENT DOCUMENTS

| | | | |
|---|---|---|---|
| 4,925,456 | A | 5/1990 | Egglestone |
| 5,603,891 | A * | 2/1997 | Brill ............... C22C 19/058 |
| | | | 420/443 |
| 6,409,974 | B1 * | 6/2002 | Towler ............... C01B 3/16 |
| | | | 422/171 |
| 6,793,698 | B1 | 9/2004 | Sanger et al. |
| 2002/0090329 | A1 | 7/2002 | Ternan |
| 2004/0182001 | A1 | 9/2004 | Masemore et al. |
| 2007/0000173 | A1 | 1/2007 | Boe et al. |
| 2007/0130832 | A1 | 6/2007 | Liu et al. |
| 2014/0178782 | A1 | 6/2014 | Gillespie et al. |

FOREIGN PATENT DOCUMENTS

| | | |
|---|---|---|
| EP | 1 094 031 A1 | 4/2001 |
| JP | 2005-353347 A | 12/2005 |
| JP | 2005353347 A * | 12/2005 |
| WO | WO-01/55027 A1 | 8/2001 |
| WO | WO-02/00548 A1 | 1/2002 |
| WO | WO-02/40619 A2 | 5/2002 |
| WO | WO-2015/107322 A1 | 7/2015 |

* cited by examiner

SHIFT REACTOR FOR DIRECT FUEL CELL HYDROGEN SYSTEM

STATEMENT OF GOVERNMENT RIGHTS

This invention was made with government support under DE-EE0003679 awarded by the Department of Energy. The government has certain rights in this invention.

BACKGROUND

The present application relates generally to fuel cell systems (e.g., molten carbonate or other high operating temperature fuel cell systems, etc.), and more specifically to multi-stage shift reactors for use with such fuel cell systems.

The hydrogen content of the anode exhaust gas from a fuel cell may be increased using a multi-stage shift reactor with cooling between stages. The multi-stage shift reactor cools the exhaust and increases the hydrogen content using a water-gas shift reaction to maximize hydrogen and minimize carbon monoxide (CO) in the exhaust gas.

Conventionally, each stage of a multi-stage shift reaction occur in separate vessels. However, in the present application, each stage is performed within a single reactor vessel. This arrangement reduces the space required for housing a multi-shift reactor. Further, because only the outermost vessel needs to be capable of withstanding higher pressure, production costs may also be reduced. Those reviewing the present disclosure will appreciate that these and other advantages may be obtained using the concepts disclosed herein.

SUMMARY

An exemplary embodiment relates to a multi-stage shift reactor including a vessel having an inner chamber configured to contain a first shift catalyst, the first shift catalyst configured to receive anode exhaust gas from a fuel cell and to output a first shifted gas, and an outer chamber annularly disposed about the inner chamber and configured to contain a second shift catalyst, the second shift catalyst configured to receive the first shifted gas and output a second shifted gas. The shift reactor further includes a water injection port downstream from the inner chamber and packing between the water injection port and the outer chamber, the packing configured to prevent liquid water from passing therethrough.

Another exemplary embodiment relates to a fuel cell system including a fuel cell having an anode and a cathode, the anode configured to output exhaust, and a shift reactor defining a first chamber and a second chamber. The system further includes a first shift catalyst disposed in the first chamber and a second shift catalyst disposed in the second chamber. The system further includes a water injection port and packing configured to prevent liquid water from passing therethrough, wherein the packing is disposed between the first shift catalyst and the second shift catalyst, and wherein the water injection port is disposed between the first shift catalyst and the packing.

Another exemplary embodiment relates to a method of converting exhaust from an anode of a fuel cell including receiving, in a first shift catalyst, anode exhaust gas from a fuel cell, performing a first water-gas shift reaction in the first shift catalyst, and outputting a first shifted gas from the first shift catalyst. The method further includes cooling the first shifted gas and passing the first shifted gas through packing configured to retain liquid water from passing therethrough. The method further includes receiving, in a second shift catalyst, the first shifted gas, performing a second water-gas shift reaction in the second shift catalyst, and outputting a second shifted gas from the second shift catalyst.

DETAILED DESCRIPTION

According to an exemplary embodiment, a multi-stage shift reactor may be used to efficiently increase the hydrogen content of high temperature fuel cell anode exhaust gas by using a two-stage shift system with cooling between the stages. This system cools the exhaust and boosts the hydrogen content using the water-gas shift reaction:

$$CO+H_2O \rightarrow H_2+CO_2 \qquad (1)$$

to maximize the hydrogen content and minimize CO in the gas. The equilibrium of this reaction is favored by a lower temperature. Accordingly, the temperature at the shift reactor outlet should be as low as possible. However, the kinetics of the reaction limit the amount of conversion when the temperature is below a range of 400-450° F.

The water-gas shift reaction is exothermic, such that gas in the reactor increases in temperature. Therefore, in order to get close to the desired lower temperatures for the final shift outlet temperature, a multi-stage reactor may be used with cooling between the stages. Because of a high carbon dioxide ($CO_2$) and water content in anode exhaust gas, the temperature rise is lower than occurs in other conventional shift reaction systems. Typically the temperature rise in the first stage shift unit using anode exhaust gas feed is less than 100° F. and the temperature rise in the second stage shift is less than 10° F. The lower temperature rise in the second stage is due to the fact that most of the CO has been subject to the water-gas shift reaction, generating hydrogen in the first stage reactor such that only a smaller additional amount of CO is shifted in the second stage and the heat released from the reaction is lower.

Figure 1:
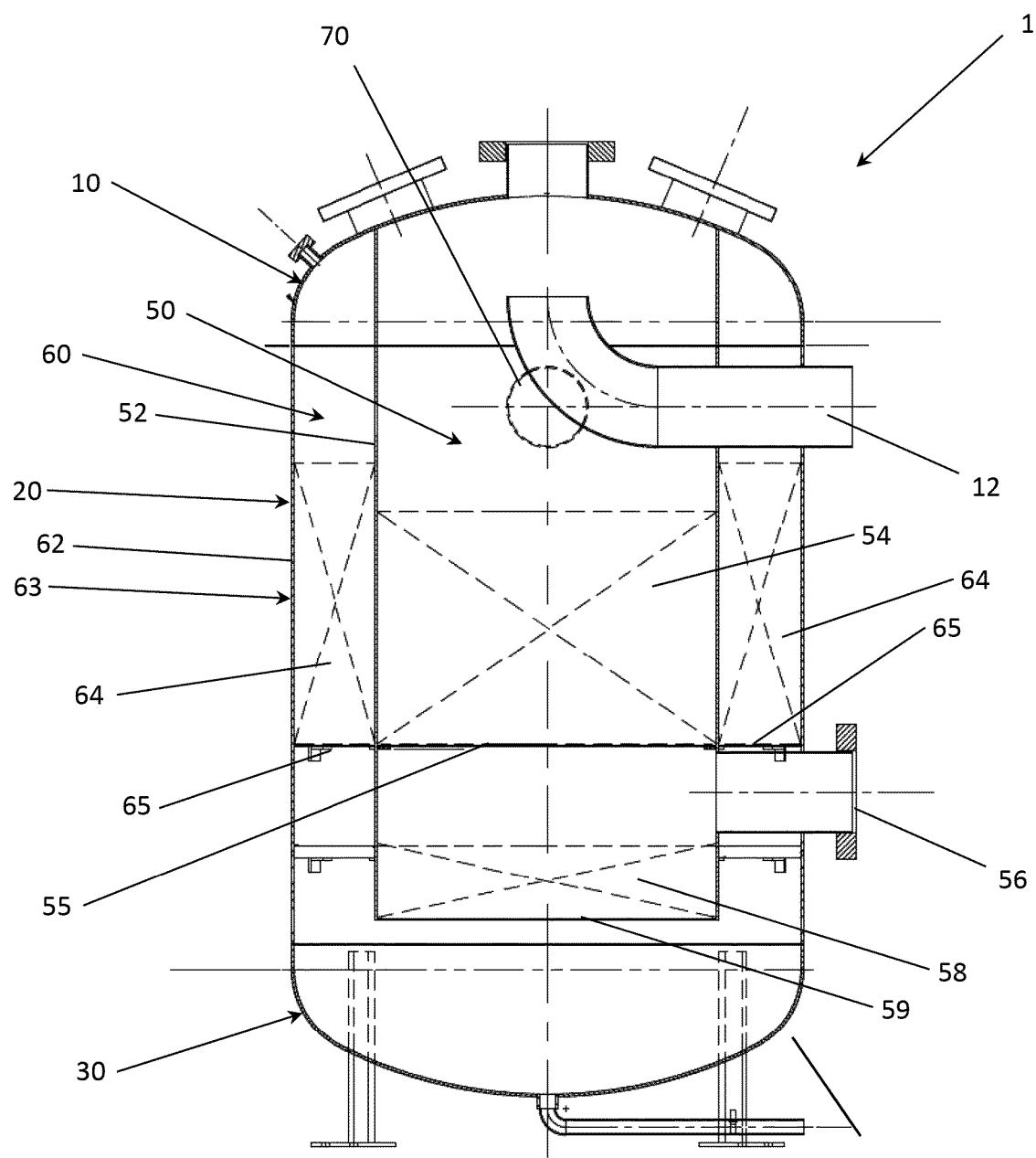
FIG. 1 shows a side schematic view of a vessel of a multi-stage shift reactor.
Figure 2:
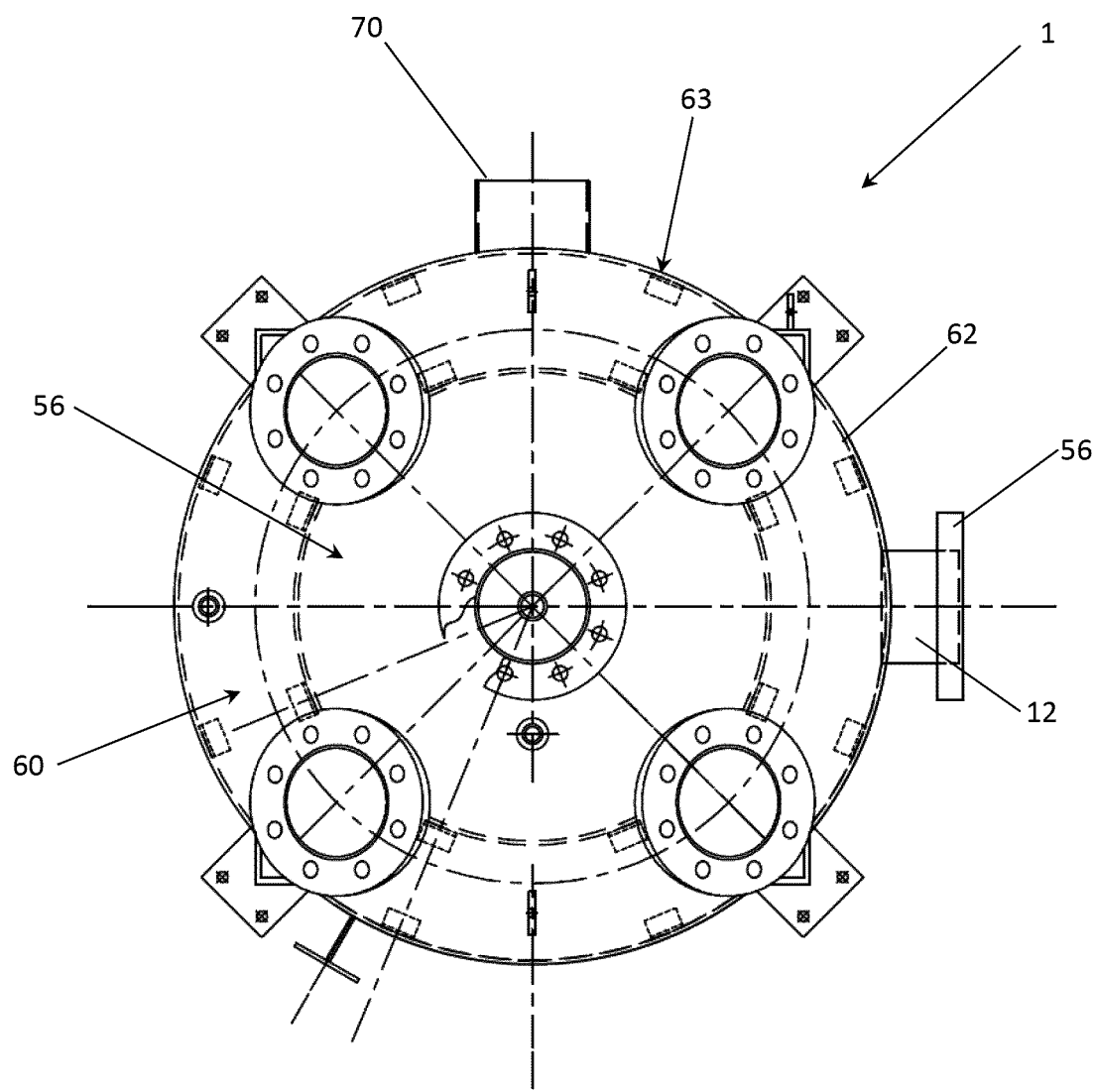
FIG. 2 shows top schematic view of the vessel of FIG. 1.

Referring now to FIG. 1, a multi-stage shift reactor includes a vessel 1 that is configured to house or contain one or more shift reactions under pressure. According to an exemplary embodiment, the vessel 1 defines an upper portion 10 and a lower portion 30, with a center portion 20 disposed therebetween. Each of the upper portion 10, center portion 20, and lower portion 30 may be integrally formed with any of the other portions or may be separately formed and joined (e.g., welded, bolted, riveted, etc.) together to form the sealed vessel 1. The upper portion 10 and lower portion 30 may each be a generally ellipsoid shape. As shown in FIG. 1, for example, the ellipsoid shape may have a major axis that is approximately twice the length of a minor axis. According to other exemplary embodiments, each of the upper portion 10 and lower portion 30 may have other shapes. As shown in FIG. 2, the center portion 20 has a generally cylindrical body. According to other exemplary embodiments, the center portion 20 may have other shapes corresponding with the shapes of each of the upper portion 10 and lower portion 30.

The vessel 1 further defines an inner or first chamber 50 and an outer or second chamber 60. The inner chamber 50 may be generally cylindrical and defined by an inner wall 52. The inner wall 52 extends from an inner surface of the first portion 10 through the center portion 20 of the vessel 1, fluidly separating the inner chamber 50 from the outer chamber 60. The outer chamber 60 is defined between the inner wall 52 and an outer wall 62 forming the vessel 1. As shown in FIG. 1, the outer chamber 60 is disposed annularly about the inner chamber 50. According to other exemplary embodiments the chambers may be arranged in other ways within the vessel 1 (e.g., top and bottom, side by side, etc.). According to an exemplary embodiment, the inner chamber 50 is configured to house a first shift reaction and the outer chamber 60 is configured to house a second shift reaction. According to other exemplary embodiments, the vessel 1 may define more or fewer chambers. For example, the vessel may define a chamber for each stage of a multi-stage shift reaction.

Because the inner chamber 50 and outer chamber 60 are formed within the same pressurized vessel 1, there is either a reduced or no pressure differential between the inner chamber 50 and the outer chamber 60. Only the outer wall 62 of the vessel 1 may be required to satisfy safety code requirements. Therefore, the reduced pressure differential on either side of the inner wall 52, corresponding with the pressures in each of the inner chamber 50 and outer chamber 60, reduces the amount of material required for forming an inner wall 52 that is capable of containing the first shift reaction. Specifically, the material making up the inner wall 52 may be thinner than the outer wall 62 of the vessel 1, thereby reducing cost and weight associated with producing the vessel 1 compared to a conventional multi-stage shift reactor.

The vessel 1 may include a layer of insulation 63 disposed around the outer wall 62 of the vessel 1 for reducing heat transfer therethrough. However, within the vessel 1, heat may transfer between multiple shift reactions. Specifically, heat may transfer through the inner wall 52 or by other means between the first and second shift reactions. According to another exemplary embodiment, the insulation 63 may be disposed within the outer chamber 60 or may be contained between the outer wall 62 and an additional shell. According to another exemplary embodiment, the vessel 1 may be wrapped with one or more heater bands for providing heat to at least one of the first and second shift reactions.

As shown in FIG. 1, a gas inlet 12 extends through the outer wall 62 and the outer chamber 60 to fluidly connect the anode side of the fuel cell to the inner chamber 50. The gas inlet 12 receives exhaust gas from an anode side of a high temperature fuel cell (not shown) and feeds the exhaust gas to the inner chamber 50. A first shift catalyst 54 then receives the exhaust gas and outputs a first shifted gas. The first shift catalyst 54 is disposed within the inner chamber 50 downstream from the gas inlet 12. The first shift catalyst 54 is supported by a first perforated plate 55. A perforated plate may be formed from metal or other suitable material (e.g., mesh) and is configured to allow the first shifted gas to pass therethrough while holding the first shift catalyst 54 in place. According to an exemplary embodiment, the first shift catalyst 54 may be a commercially available shift catalyst, for example, Clariant ShiftMax® 230. After passing through the first shift catalyst 54, most of the CO from the exhaust is reacted with water to generate hydrogen through the water-gas shift reaction. According to an exemplary embodiment, CO may be reduced between 80% and 90% and hydrogen increased between 40% and 50% through the first shift catalyst 54. The overall volume of the first shift catalyst 54 may be selected to react a specified amount of CO from the anode exhaust gas and/or establish a desired space velocity over the first shift catalyst 54. The first shift catalyst 54 may include pellets (i.e., tablets) having a size and distribution configured to establish a desired pressure drop across the first shift catalyst 54. According to another exemplary embodiment, the first shift catalyst 54 may have a cross-sectional area configured to establish a desired pressure drop across the first shift catalyst 54. A height of the first shift catalyst 54 may be determined based on the cross sectional area of the inner chamber 50 and desired total volume of the first shift catalyst 54. According to an exemplary embodiment, the first shift catalyst 54 has a height of about 19 inches and a diameter of about 28 inches.

After the anode exhaust reacts on the first shift catalyst 54, water is injected through a port 56 to cool down the first shifted gas. The port 56 extends through the outer wall 62, the outer chamber 60, and the inner wall 52, fluidly connecting a water source (not shown) to the inner chamber 50 downstream from first shift catalyst 54. Heat from the exothermic shift reaction converts at least some of the injected water into steam. Heat is absorbed by the steam from the first shifted gas, which cools down the first shifted gas. The amount of cooling may be controlled by the amount of water injected. According to another exemplary embodiment, lower temperature steam is injected through port 56 to cool the first shifted gas. Cooling the first shifted gas may also be accomplished by a heat exchanger, either in combination with or in place of adding water. The heat exchanger may be disposed within the inner chamber 50. As shown in FIG. 2, the port 56 and the gas inlet 12 are vertically aligned. According to other exemplary embodiments, the port 56 and the gas inlet 12 may extend from the vessel 1 in different directions.

Packing (i.e., a filter) 58 is disposed at a bottom end of the inner chamber 50 downstream from the port 56. Liquid water may cause damage to shift catalysts and may not fully vaporize if the water is not thoroughly dispersed and fully contacting the first shifted gas, and therefore, the packing 58 is configured to ensure sufficient contact between the injected water and the first shifted gas such that substantially all the injected water is converted to steam to pass through to a second shift catalyst 64. According to an exemplary embodiment, the packing 58 may include raschig rings, saddles, or other types of packing commonly used in distillation columns. The water may be injected using a distribution system (not shown) configured to provide thorough distribution of the water over the packing 58. According to an exemplary embodiment, the distribution system may include tubing with evenly spaced small holes disposed therein, although other distribution systems may be used in addition to or instead of the tubing. Water that is not vaporized falls to the bottom of the inner chamber 50 rather than being carried to the second shift catalyst 64. As shown in FIG. 1, the packing 58 is located below the first shift catalyst 54. Accordingly, gravity holds excess water against the packing 58, preventing the water from contacting the first shift catalyst 54, which can also be damaged by coming into contact with water. The packing 58 is supported by a second perforated plate 59, which defines a bottom end of the inner chamber 50. The second perforated plate 59 may be formed from metal or other suitable material and is configured to allow the first shifted gas and steam to pass therethrough while holding the packing 58 in place. The overall volume of the packing 58 may be selected to prevent either all or a specified amount of the water from passing therethrough without vaporizing to steam. A height of the packing 58 may be determined based on the cross sectional area of the inner chamber 50 (e.g., the same as that of the first shift catalyst 54) and desired total volume of the packing 58. According to an exemplary embodiment, the packing 58 has a height of about six inches and a diameter of about 28 inches.

The steam and the first shifted gas pass through the packing 58 and the second perforated plate 59 in the inner chamber 50 to the lower portion 30 of the vessel 1, making up a portion of the outer chamber 60. A drain 32 is disposed in the lower portion 30 of the vessel. According to an exemplary embodiment, the drain 32 extends from a lowermost end of the lower portion 30. The drain 32 is configured to remove any water which may accumulate during conditions (i.e., upset conditions) in which water passes through the packing 58.

According to an exemplary embodiment, in the lower portion 30 of the vessel 1, the flow of the steam and first shifted gas (i.e., steam and gas mixture) transitions from the downward direction to the upward direction. The flow of the steam and gas mixture generally downward through the first shift catalyst 54 and generally upward through the second shift catalyst 64 provides an advantage of reducing the chance of water contacting and reacting with either of the first and second shift catalysts 54, 64. As stated above, water can damage a shift catalyst, so the above-described flow direction reduces the risk of damaging the shift catalysts 54, 64. Conventionally, a multi-stage shift reactor using water cooling between stages requires the gas following the first shift reaction to be fed through a separate vessel (e.g., water knockout pot) to remove excess water that is not converted to steam. For example, in a shift reactor that has the flow moving in the generally upward direction through a first shift catalyst and generally downward through a second shift catalyst, water that is not converted to steam may fall and contact the shift catalysts. To avoid the resulting damage, shifted gas between the two reactions must be removed from the reactor and sent to a remote vessel for injecting cooling water and removing any excess water before being reintroduced to the second shift catalyst. This additional vessel increases the cost and complexity of the system as well as heat loss from the system by transferring the shifted gas over a distance. To avoid such losses, according to an exemplary embodiment shown in FIGS. 1 and 2, the entire exhaust conversion process may take place in a single vessel 1.

Referring still to FIG. 1, the second shift catalyst 64 receives the first shifted gas and outputs a second shifted gas. The second shift catalyst 64 is disposed within the outer chamber 60 and is supported by a third perforated plate 65. As shown in FIG. 1, the second shift catalyst 64 may be placed above the packing 58 and the third portion 30 of the vessel 1, such that the first shifted gas passes upwardly through the second shift catalyst 64. After passing through the second shift catalyst 64, most of the remaining CO from the first shifted gas is reacted with water to generate additional hydrogen through the water-gas shift reaction, and the second shift catalyst 64 outputs the second shifted gas. According to an exemplary embodiment, CO may be reduced between 45% and 55% and hydrogen increased between 2% and 5% through the second shift catalyst 64. Accordingly, at least a portion of the remaining CO is subject to the water-gas shift reaction, generating hydrogen and maximizing hydrogen production over a shift reactor having a single-stage shift reaction. The multi-stage shift reactor also minimizes CO output generated from the shifted anode exhaust gas.

The overall volume of the second shift catalyst 64 may be selected to react a specified amount of CO from the first shifted gas. The second shift catalyst 64 may include pellets (i.e., tablets) having a size and distribution configured to establish a desired pressure drop across the second shift catalyst 64. According to another exemplary embodiment, the second shift catalyst 64 may have a cross-sectional area configured to establish a desired pressure drop across the second shift catalyst 64. A height of the second shift catalyst 64 may be determined based on the cross-sectional area of the outer chamber 60 and desired total volume of the second shift catalyst 64. According to an exemplary embodiment, the second shift catalyst 64 has a height of about 23 inches, an inner diameter of about 28 inches, and an outer diameter of about 42 inches. According to another exemplary embodiment, the volume of the second shift catalyst 64 is approximately the same as the volume of the first shift catalyst 54.

According to an exemplary embodiment, the temperature of the gas fed into the second shift reaction and received by the second shift catalyst 64 is substantially similar to or the same as the temperature of the anode exhaust gas fed into the first shift reaction and received by the first shift catalyst 54. Accordingly, the first and second shift reactions do not require different catalyst materials capable of accommodating shifts in different temperature ranges. The second shift catalyst 64 may be the same or a different material as that first shift catalyst 54. By using only one shift catalyst material, the cost of producing the shift reactor may be reduced.

After passing through the second shift catalyst 64, the second shifted gas is output from the vessel 1 through a gas outlet 70. As shown in FIGS. 1 and 2, the gas outlet 70 extends through the outer wall 62. According to an exemplary embodiment, the gas outlet 70 extends through the outer wall 62 but not the inner wall 52. The second shifted gas may be cooled, wherein water in the second shifted gas is condensed and separated from the remaining second shifted gas. The remaining second shifted gas may then be sent to a purification system (not shown) configured to separate hydrogen from other gases forming the remaining second shifted gas, mostly including $CO_2$. Either a portion or substantially all of the output second shifted gas may be recycled to a fuel cell, for example, during fuel cell start-up or when the purification is not yet ready to operate. According to other exemplary embodiments, the second shifted gas may be used in a fuel cell system or may otherwise be exported for other uses or discarded.

While the above embodiments disclose the first shift reaction occurring in the inner chamber 50 and the second shift reaction occurring in the outer chamber 60, according to another exemplary embodiment, the first shift reaction may occur in the outer chamber 60 and the second shift reaction may occur in the inner chamber 50. In this configuration, the gas inlet 12 fluidly connects to the outer chamber 60 through the outer wall 62. The gas outlet 70 extends from the inner chamber 50, through the inner wall 52, the outer chamber 60, and the outer wall 62. The port 56 extends through the outer wall 62 to fluidly connect the water source to the outer chamber 60. The packing 58 is disposed in either the inner chamber 50 or the outer chamber 60, downstream from the port 56.

According to another exemplary embodiment, a multi-stage reactor may include more than two shift reactions. Each reaction may include a separate shift reaction and may occur in its own chamber. More than one port 56 may be included to provide water for cooling the gas between each shift reaction.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A multi-stage shift reactor comprising:
   a vessel comprising:
      an inner chamber configured to contain a first shift catalyst, the first shift catalyst configured to receive anode exhaust gas from a fuel cell and to output a first shifted gas; and
      an outer chamber annularly disposed about the inner chamber and configured to contain a second shift catalyst, the second shift catalyst configured to receive the first shifted gas and output a second shifted gas;
   a water injection port downstream from the inner chamber; and
   packing between the water injection port and the outer chamber, the packing configured to prevent liquid water from passing therethrough.

2. The shift reactor of claim 1, wherein the inner chamber and the outer chamber are configured to transfer heat therebetween.

3. The shift reactor of claim 1, wherein the vessel is configured to contain the first shifted gas.

4. The shift reactor of claim 1, wherein each of the inner chamber and outer chamber are at substantially the same pressure.

5. The shift reactor of claim 1, wherein the inner chamber is defined by an inner wall and the outer chamber is defined by an outer wall; and
   wherein the outer wall is thicker than the inner wall.

6. The shift reactor of claim 1, further comprising the first shift catalyst and the second shift catalyst;
   wherein each of the first shift catalyst and the second shift catalyst comprises a same material.

7. The shift reactor of claim 1, further comprising a perforated plate disposed in the inner chamber, the perforated plate configured to support the first shift catalyst;
   wherein the perforated plate is configured to allow the first shifted gas to pass therethrough.

8. A fuel cell system comprising:
   a fuel cell having an anode and a cathode, the anode configured to output exhaust;
   a shift reactor defining a first chamber and a second chamber;
   a first shift catalyst disposed in the first chamber and a second shift catalyst disposed in the second chamber;
   a water injection port; and
   packing configured to prevent liquid water from passing therethrough;
   wherein the packing is disposed between the first shift catalyst and the second shift catalyst; and
   wherein the water injection port is disposed between the first shift catalyst and the packing.

9. The shift reactor of claim 8, wherein the first chamber is configured to receive exhaust from the anode, pass the exhaust generally downward in the first shift catalyst, and output a first shifted gas.

10. The shift reactor of claim 9, wherein the second chamber is configured to receive the first shifted gas from the first chamber, pass the first shifted gas generally upward in the second shift catalyst, and output a second shifted gas.

11. The shift reactor of claim 8, wherein each of the first shift catalyst and the second shift catalyst comprise the same material.

12. A method of converting exhaust from a fuel cell comprising:
   receiving, in a first shift catalyst, anode exhaust gas from a fuel cell;
   performing a first water-gas shift reaction in the first shift catalyst;
   outputting, from the first shift catalyst, a first shifted gas;
   cooling the first shifted gas;
   passing the first shifted gas through packing configured to retain liquid water from passing therethrough;
   receiving, in a second shift catalyst, the first shifted gas;
   performing a second water-gas shift reaction in the second shift catalyst; and
   outputting a second shifted gas from the second shift catalyst.

13. The method of claim 12, wherein the exhaust is output from an anode of the fuel cell.

14. The method of claim 12, wherein the first shifted gas is cooled by injecting water.

15. The method of claim 14, wherein the water is injected downstream from the first shift catalyst.

16. The method of claim 12, wherein the first shifted gas is cooled by a heat exchanger.

17. The method of claim 12, wherein the method is performed within a single vessel.

18. The method of claim 12, wherein the anode exhaust gas flow generally downward through the first shift catalyst; and wherein the first shifted gas flows generally upward through the second shift catalyst.

19. The method of claim 12, wherein substantially all of the first shifted gas is passed through the packing before being received in the second shift catalyst.

20. The method of claim 12, wherein the anode exhaust gas received by the first shift catalyst and the first shifted gas received by the second shift catalyst are at substantially similar temperatures.

* * * * *